US009327418B2

(12) United States Patent
Horiuchi et al.

(10) Patent No.: US 9,327,418 B2
(45) Date of Patent: May 3, 2016

(54) ADHESIVE FILM

(75) Inventors: Kouhei Horiuchi, Chikusei (JP); Michio Uruno, Chikusei (JP); Hiroaki Takahashi, Chikusei (JP); Tomoyuki Nakamura, Chikusei (JP); Mitsuyoshi Shimamura, Chikusei (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 244 days.

(21) Appl. No.: 13/615,782

(22) Filed: Sep. 14, 2012

(65) Prior Publication Data

US 2013/0071596 A1 Mar. 21, 2013

(30) Foreign Application Priority Data

Sep. 16, 2011 (JP) ................................ P2011-203447
Jun. 28, 2012 (JP) ................................ P2012-145805
Aug. 7, 2012 (JP) ................................ P2012-175137

(51) Int. Cl.
*C09J 7/02* (2006.01)
*B26D 3/08* (2006.01)
*B32B 38/10* (2006.01)

(52) U.S. Cl.
CPC ................. *B26D 3/08* (2013.01); *C09J 7/0296* (2013.01); *Y10T 83/0341* (2015.04); *Y10T 156/1062* (2015.01); *Y10T 428/14* (2015.01)

(58) Field of Classification Search
CPC ............ B26D 3/08; C09J 7/0296; C09J 7/02; C09J 2201/128; C09J 2201/36; Y10T 83/0341; Y10T 428/14; Y10T 428/1476; Y10T 428/149; Y10T 428/15; Y10T 156/1062
USPC ................. 428/40.1, 41.8, 42.2, 43, 192, 906
See application file for complete search history.

(56) References Cited

U.S. PATENT DOCUMENTS 3,741,786 A * 6/1973 Torrey ......................... 428/41.9
4,999,242 A 3/1991 Ishiwata et al.
5,330,812 A 7/1994 Knoerzer et al.

(Continued)

FOREIGN PATENT DOCUMENTS

CN 1471566 1/2004
CN 1497703 5/2004

(Continued)

OTHER PUBLICATIONS

Japanese Official Action (Notice of Allowance) dated Jan. 4, 2011, for JP Application No. 2004-300541.

(Continued)

*Primary Examiner* — Patricia L Nordmeyer
(74) *Attorney, Agent, or Firm* — Fitch, Even, Tabin and Flannery LLP

(57) ABSTRACT

An adhesive film includes a film-like adhesive layer and a pair of separators sandwiching the adhesive layer. The outer edges of both separators extend outward beyond the outer edge of the adhesive layer, and a blade is used to form a notch on the adhesive layer side of the heavy release separator, along the outer edge of the adhesive layer. The thickness of the heavy release separator is between 50 μm and 200 μm, the average notch depth is between 5 μm and 45 μm and the standard deviation for the notch depth is no greater than 15 μm. Specifying the notch depth allows complete cutting of the adhesive layer with the blade, while also limiting release problems between the heavy release separator and the adhesive layer.

8 Claims, 17 Drawing Sheets

(56) References Cited

U.S. PATENT DOCUMENTS

| | | | | |
|---|---|---|---|---|
| 5,705,016 | A | 1/1998 | Senoo et al. | |
| 6,506,490 | B1 | 1/2003 | Yamamoto | |
| 8,323,761 | B2 * | 12/2012 | Nakayama et al. | 428/40.1 |
| 2004/0007327 | A1 | 1/2004 | Kobayashi | |
| 2004/0009650 | A1 | 1/2004 | Jeong et al. | |
| 2005/0037542 | A1 | 2/2005 | Sato et al. | |
| 2005/0084641 | A1 * | 4/2005 | Downs et al. | 428/42.3 |
| 2008/0261039 | A1 | 10/2008 | Tanaka et al. | |
| 2010/0135176 | A1 | 6/2010 | Kazmi et al. | |

FOREIGN PATENT DOCUMENTS

| | | |
|---|---|---|
| CN | 1800285 | 7/2006 |
| CN | 101040023 | 9/2007 |
| EP | 1411547 | 4/2004 |
| JP | H2-71878 | 5/1990 |
| JP | 6-501213 | 2/1994 |
| JP | 6-18383 | 3/1994 |
| JP | 6-502881 | 3/1994 |
| JP | 7-15087 | 2/1995 |
| JP | 3021645 | 2/1996 |
| JP | 08-243997 | 9/1996 |
| JP | 09-085696 | 3/1997 |
| JP | 2678655 | 8/1997 |
| JP | 10-144375 | 5/1998 |
| JP | 2759590 | 5/1998 |
| JP | 10-291376 | 11/1998 |
| JP | 10-335271 | 12/1998 |
| JP | 11-034281 | 2/1999 |
| JP | 11-188830 | 7/1999 |
| JP | 11-309792 | 11/1999 |
| JP | 2000-221888 | 8/2000 |
| JP | 2000-254891 | 9/2000 |
| JP | 2001-051604 | 2/2001 |
| JP | 2001-059074 | 3/2001 |
| JP | 2001-162594 | 6/2001 |
| JP | 3348923 | 9/2002 |
| JP | 2003-136487 | 5/2003 |
| JP | 2004-042310 | 2/2004 |
| JP | 2004-043763 | 2/2004 |
| JP | 2004-045812 | 2/2004 |
| JP | 2004-046763 | 2/2004 |
| JP | 2004-072040 | 3/2004 |
| JP | 2004-134689 | 4/2004 |
| JP | 2004-512418 | 4/2004 |
| JP | 2004-217793 | 8/2004 |
| JP | 2004-256595 | 9/2004 |
| JP | 2004-266137 | 9/2004 |
| JP | 2005-162818 | 6/2005 |
| JP | 2005-239759 | 9/2005 |
| JP | 2005-350520 | 12/2005 |
| JP | 2008-83491 | 4/2008 |
| KR | 10-0239847 | 1/2000 |
| WO | WO 92/08429 A1 | 5/1992 |
| WO | WO 03/016419 | 2/2003 |

OTHER PUBLICATIONS

Chinese Official Action issued on Nov. 20, 2009, for Application No. 2005800349933.

U.S. Office Action dated Apr. 10, 2012, for U.S. Appl. No. 13/310,531.

Korean Official Action dated Jul. 19, 2011, for KR Application No. 10-2008-7024430.

U.S. Office Action dated Aug. 20, 2012, for U.S. Appl. No. 11/577,255.

Chinese Official Action dated Dec. 6, 2012, for CN Application No. 201110060453.X.

Korean Submission of Documents dated Feb. 27, 2013, for KR Appeal No. 2012-3985.

U.S. Office Action dated Apr. 3, 2014, for U.S. Appl. No. 13/367,118.

U.S. Office Action dated Aug. 27, 2013, for U.S. Appl. No. 13/367,118.

U.S. Office Action dated Apr. 16, 2012, for U.S. Appl. No. 13/310,515.

U.S. Office Action dated Jun. 14, 2011, for U.S. Appl. No. 11/577,255.

CN Office Action of Appln. No. 201210355142.0 dated Feb. 2, 2015.

* cited by examiner

ADHESIVE FILM

BACKGROUND OF THE INVENTION

1. Field of the Invention

The present invention relates to an adhesive film and to a method for producing it.

2. Related Background Art

In recent years, touch panels are being incorporated in the liquid crystal display devices of cellular phones, portable gaming devices, digital cameras, car navigation systems, handheld computers, portable data terminals (PDA) and the like. Such liquid crystal display devices (hereunder also referred to as "touch panel displays") are constructed in a layered manner, with a protective panel, touch panel and liquid crystal panel in that order, there being disposed transparent adhesive layers between the protective panel and touch panel or between the touch panel and liquid crystal panel (see PTL 1, for example). Because such adhesive layers help increase the brightness and visibility of the display while also functioning as a shock absorption material, they are indispensable components of the display structure.

[PTL 1] Japanese Unexamined Patent Application Publication No. 2008-83491

SUMMARY OF THE INVENTION

The type of adhesive layer described above is preferably handled as an adhesive film that is sandwiched on both adhesive sides with releasable base materials, in order to prevent adhesion of dirt and dust during storage and transport. The adhesive layer is preferably formed beforehand to the size of the liquid crystal display device in which it is intended to be used. When the adhesive layer, together with the base materials, is cut into the desired shape, and the outer edge of the adhesive layer and the outer edges of the base materials are aligned, dust tends to easily adhere to the cut surfaces of the adhesive layer, and the base materials can be difficult to release from the adhesive layer. Therefore, it is preferred for at least one of the outer edges of the base materials to extend outward beyond the outer edge of the adhesive layer. One example of a method for producing an adhesive film having such a construction involves first forming the adhesive layer on one base material and then cutting the adhesive layer without cutting the base material. For complete cutting of the adhesive layer alone, it is necessary to pass the blade up to a depth reaching the base material. A Notch is also formed in the base material, along the outer edge of the adhesive layer. However, research by the present inventors has indicated that, depending on the condition of the notch formed in the base material, this can interfere with release of the base material from the adhesive layer.

Being the result of much effort toward finding a solution to this problem, this invention is intended to provide an adhesive film that can minimize release problems between the adhesive layer and each of the base materials, as well as a method for producing the adhesive film.

The adhesive film of the invention comprises a film-like adhesive layer and a pair of base materials sandwiching the adhesive layer, wherein the outer edges of the base materials extend outward beyond the outer edge of the adhesive layer, a notch is formed on the adhesive layer side of one base material, along the outer edge of the adhesive layer, the thickness of that base material being between 50 μm and 200 μm, the average notch depth being between 5 μm and 45 μm, and the standard deviation for the notch depth being no greater than 15 μm.

With this type of adhesive film, the outer edges of the base materials extend outward beyond the outer edge of the adhesive layer, and therefore the outer edge section of the adhesive layer is reliably protected during storage and transport of the adhesive film. In addition, a notch is formed using a blade or the like on the adhesive layer side of one base material that has a thickness between 50 μm and 200 μm, and the average notch depth is at least 5 μm. This allows complete cutting of the adhesive layer as the blade reliably passes through to the base material side. The average notch depth is also no greater than 45 μm. This can prevent portions of the adhesive layer from deeply intruding into the notch during cutting of the adhesive layer with the blade. By minimizing intrusion of the adhesive layer into the notch, it is possible to reduce release problems between the adhesive layer and each of the base materials. The standard deviation for the notch depth is 15 μm. This will reduce variation in the notch depth to allow complete cutting of the adhesive layer, while also providing a more reliable effect for minimizing release problems between the adhesive layer and each of the base materials. The notch depth can be stipulated by the standard deviation in this manner based on the fact that the effect of the invention is not impeded even if some portions of the notch along the outer edge of the adhesive layer has depths outside of the aforementioned range.

The peel strength between the one base material and the adhesive layer is also preferably higher than the peel strength between the other base material layer and the adhesive layer. By thus producing a difference between the peel strength on the one base material side and the peel strength on the other base material side, orderly release of the base materials is facilitated.

Also, preferably the outer edge of the adhesive layer forms a rectangular planar shape, the average notch depth is between 5 μm and 45 μm at multiple measured points, allocated in at least one location on each side of the outer edge of the adhesive layer, and the standard deviation for the notch depth at multiple measured points is no greater than 15 μm. This will allow complete cutting of the adhesive layer, while also providing a more reliable effect for minimizing release problems between the adhesive layer and each of the base materials.

The storage elastic modulus of the adhesive layer at 25° C. is preferably between $1.0\times10^3$ Pa and $1.0\times10^6$ Pa. This will result in a closer relationship between the notch depth and the cuttability and releasability of the adhesive layer, so that the effect of limiting the notch depth to the aforementioned range will be more prominent.

The peel strength of the adhesive layer for a glass substrate is preferably between 5 N/10 mm and 20 N/10 mm. This will result in an even closer relationship between the notch depth and the cuttability and releasability of the adhesive layer, so that the effect of limiting the notch depth to the aforementioned range will be even more prominent.

The method for producing the adhesive film of the invention, which is provided with a film-like adhesive layer and a pair of base materials sandwiching the adhesive layer, comprises a cutting step in which a blade is passed through a preliminary film that is composed of the adhesive layer formed on one of the base materials, to a depth reaching from the adhesive layer to that base material, and the outer edge of the adhesive layer is cut to the prescribed shape, wherein in the cutting step, the blade reaches the base material in such a manner that the average notch depth formed in the base material by the blade is between 5 μm and 45 μm, and the standard deviation for the notch depth is no greater than 15 μm.

In this method for producing an adhesive film, the average notch depth is at least 5 μm. This allows complete cutting of the adhesive layer as the blade reliably passes through to the base material side. The average notch depth is also no greater than 45 μm. This can prevent portions of the adhesive layer from deeply intruding into the notch during cutting of the adhesive layer with the blade. By minimizing intrusion of the adhesive layer in the notch, it is possible to reduce release problems between the adhesive layer and each of the base materials. The standard deviation for the notch depth is also no greater than 15 μm. This will reduce variation in the notch depth to allow complete cutting of the adhesive layer, while also providing a more reliable effect of minimizing release problems between the adhesive layer and each of the base material.

After the cutting step there is preferably also provided an attachment step in which the other base material is attached to the adhesive layer. The blade will easily pass through the adhesive layer without being impeded by the other base material.

The adhesive film and production method of the invention can minimize release problems between the adhesive layer and each of the base materials.

DESCRIPTION OF THE PREFERRED EMBODIMENTS

Figure 1:
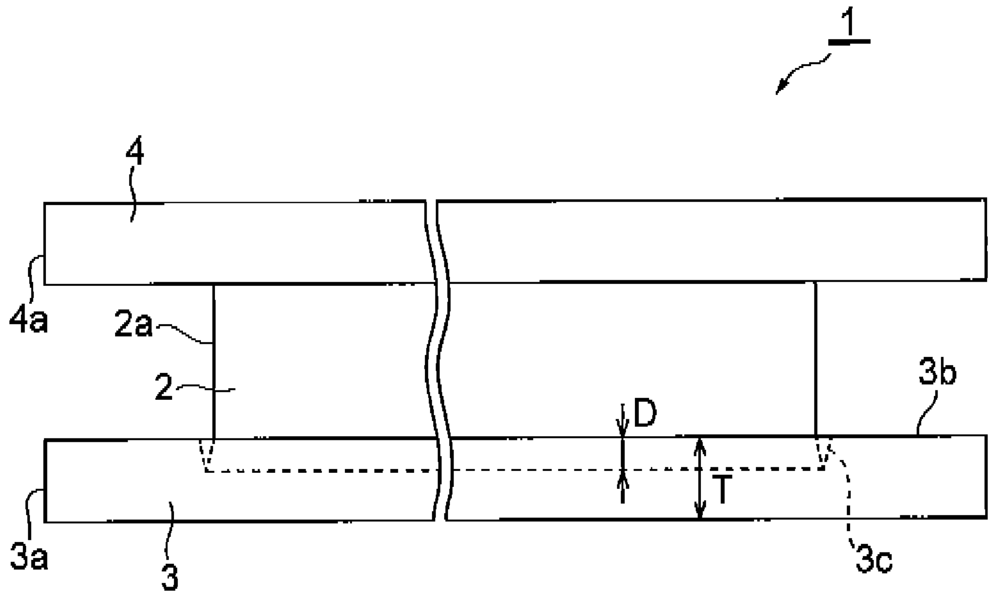
FIG. 1 is a side view of an embodiment of an adhesive film according to the invention.

As shown in FIG. 1, the adhesive film 1 of the invention comprises a transparent film-like adhesive layer 2, a heavy release separator 3 (one base material) and a light release separator 4 (other base material) that sandwich the adhesive layer 2. For assembly of a touch panel display for a portable terminal, for example, the adhesive film 1 is a transparent film intended to be disposed between a protective panel and a touch panel, or between a touch panel and a liquid crystal panel.

The adhesive layer 2 is formed, for example, by an adhesive composition that includes (A) an acrylic acid-based derivative polymer, (B) an acrylic acid-based derivative and (C) a polymerization initiator. The (A) acrylic acid-based derivative polymer may be obtained by polymerizing the (B) acrylic acid-based derivative, and preferably its weight-average molecular weight is between 10,000 and 1,000,000 (as determined using a calibration curve for standard polystyrene obtained by gel permeation chromatography, with measurement at 25° C. to 40° C. using an HPLC column employing a common porous polymer gel, and using tetrahydrofuran as the eluent, with the detector used preferably being a differential refractometer (RI detector)). The acrylic acid-based derivative polymer may be a polymer obtained by polymerization in combination with a monomer other than an acrylic acid-based derivative.

According to the invention, the content of the (A) acrylic acid-based derivative polymer is preferably between 10 mass % and 80 mass %, more preferably between 20 mass % and 50 mass % and even more preferably between 25 mass % and 45 mass %, with respect to the total weight of the adhesive composition.

The (B) acrylic acid-based derivative may be acrylic acid or methacrylic acid, or any of their derivatives. Specifically, these include (meth)acrylic acid alkyl having C1-20 alkyl, benzyl(meth)acrylate, alkoxyalkyl(meth)acrylates, aminoalkyl(meth)acrylates, (meth)acrylic acid esters of (diethyleneglycol ethyl ether), mono(meth)acrylic acid esters of polyalkylene glycols, (meth)acrylic acid esters of polyalkyleneglycol alkyl ethers, (meth)acrylic acid esters of polyalkyleneglycol aryl ethers, (meth)acrylic acid esters with alicyclic groups, fluorinated alkyl(meth)acrylates, (meth)acrylic acid esters with hydroxyl groups such as 2-hydroxyethyl(meth)acrylate, 3-hydroxypropyl(meth)acrylate, 4-hydroxybutyl(meth)acrylate and glycerol(meth)acrylate, glycidyl(meth)acrylate, (meth)acrylamide, (meth)acryloylmorpholine and the like, which have one polymerizable unsaturated bond in the molecule. Any of these may be used alone or in mixtures of two or more.

A monomer with 2 or more polymerizable unsaturated bonds in the molecule may also be used together with the aforementioned monomers that have one polymerizable unsaturated bond in the molecule. Preferred monomers are bisphenol A di(meth)acrylate, 1,4-butanediol di(meth)acrylate, 1,3-butyleneglycol di(meth)acrylate, diethyleneglycol di(meth)acrylate, glycerol di(meth)acrylate, neopentyl glycol di(meth)acrylate, polyethyleneglycol di(meth)acrylate, polypropyleneglycol di(meth)acrylate, tetraethyleneglycol dimethacrylate, trimethylolpropane trimethacrylate, pentaerythritol tri(meth)acrylate, tris((meth)acryloxyethyl)isocyanurate, pentaerythritol tetra(meth)acrylate, dipentaerythritol tetra(meth)acrylate, dipentaerythritol hexa(meth)acrylate, dipentaerythritol penta(meth)acrylate, di(meth)acrylates with urethane bonds and di(meth)acrylates with polyalkylene glycol chains and urethane bonds (having weight-average molecular weights of 5,000-100,000; determined using a calibration curve for standard polystyrene obtained by gel permeation chromatography, with measurement at 25° C. to 40° C. using an HPLC column employing a common porous polymer gel, and using tetrahydrofuran as the eluent, the detector used preferably being a differential refractometer (RI detector)). These monomers may be used either alone or in combinations of two or more. From the viewpoint of shapeability of the adhesive layer 2, it is preferred to use a monomer with 2 or more polymerizable unsaturated bonds in the molecule in component (B).

The term "(meth)acrylate" refers to the "acrylate" and its corresponding "methacrylate". Similarly, the term "(meth) acrylic" refers to the "acrylic" and its corresponding "methacrylic" compound, and "(meth)acryloyl" refers to the "acryloyl" and its corresponding "methacryloyl" compound.

For the invention, the content of the (B) acrylic acid-based derivative is preferably between 15 mass % and 89.9 mass %, more preferably between 45 mass % and 79.9 mass % and even more preferably between 50 mass % and 74.9 mass %, with respect to the total weight of the adhesive composition.

The (C) polymerization initiator may employ a photopolymerization initiator, which may be selected from among materials such as ketone-based, acetophenone-based, benzophenone-based, anthraquinone-based, benzoin-based, acylphosphine oxide-based, sulfonium salt, diazonium salt and onium salt compounds. Particularly preferred are ketone-based compounds such as 1-hydroxycyclohexylphenyl ketone, and acylphosphine oxide-based compounds such as bis(2,4,6-trimethylbenzoyl)-phenylphosphine oxide, bis(2,6-dimethoxybenzoyl)-2,4,4-trimethyl-pentylphosphine oxide and 2,4,6-trimethylbenzoyl-diphenylphosphine oxide, from the viewpoint of transparency and curing properties.

For the invention, the content of the (C) polymerization initiator is preferably between 0.1 mass % and 5 mass %, more preferably between 0.2 mass % and 4 mass % and even more preferably between 0.3 mass % and 2 mass %, with respect to the total mass of the adhesive composition.

The adhesive layer 2 is obtained by, for example, coating a liquid adhesive composition comprising components (A) to (C) on a heavy release separator 3 to a desired film thickness, and then shaping it by cutting to the desired size. The coated adhesive composition may be irradiated with active light rays such as ultraviolet rays. From the viewpoint of adhesion, the adhesive layer 2 is preferably composed mainly of a structural unit derived from a (meth)acrylic acid alkyl having C4-18 alkyl. Here, "composed mainly of" refers to the most abundant component constituting the adhesive layer 2. The thickness of the adhesive layer 2 is preferably between 0.1 mm and 1 mm, and more preferably between 0.15 mm (150 μm) and 0.5 mm (500 μm). With this range of thickness, the adhesive layer 2 will be able to exhibit an even more superior effect when applied in a display.

The storage elastic modulus of the adhesive layer 2 at 25° C. is preferably between $1.0\times10^3$ Pa and $1.0\times10^6$ Pa, and more preferably between $1.0\times10^4$ Pa and $5.0\times10^5$ Pa.

The storage elastic modulus can be measured with a dynamic viscoelasticity meter (such as an RSA II by Rheometric Scientific, with measurement in shear sandwich mode at 1 Hz), using a sample (adhesive layer 2) with a thickness of 0.5 mm, a length of 10 mm and a width of 10 mm.

The peel strength of the adhesive layer 2 for a glass substrate (soda lime glass) is preferably between 5 N/10 mm and 20 N/10 mm, and more preferably between 7 N/10 mm and 15 N/10 mm. The thickness of the adhesive layer 2 is preferably between 100 μm and 500 μm and more preferably between 150 μm and 400 μm. The planar shape of the adhesive layer 2 may be appropriately designed depending on the adherend to which it will be applied, and for example, the effect of the invention will be prominently exhibited with a rectangular shape having long sides between 50 mm and 500 mm and short sides between 30 mm and 400 mm, and even more prominently exhibited with a rectangular shape having long sides between 100 mm and 300 mm and short sides between 80 mm and 280 mm. The light transmittance of the adhesive layer 2 is preferably at least 80%, more preferably at least 90% and most preferably at least 95% for light rays in the visible light range (wavelength: 380-780 nm). The light transmittance may be measured using a spectrophotometer. As an example, the spectrophotometer may be a Hitachi Model U-3310 spectrophotometer (with integrating sphere). The light transmittance of the adhesive layer 2 can be calculated by using a spectrophotometer to measure the light transmittance of an adhesive layer-attached glass substrate, comprising a 500 μm-thick glass substrate and the adhesive layer 2 adjusted to a thickness of 175 μm, and subtracting the light transmittance of the glass substrate from the light transmittance of the adhesive layer-attached glass substrate.

The heavy release separator 3 may also be a polymer film such as polyethylene terephthalate, polypropylene, polyethylene or polyester, and is preferably a polyethylene terephthalate film (PET film). The thickness of the heavy release separator 3 is preferably between 50 μm and 200 μm, more preferably between 60 μm and 150 μm and most preferably between 70 μm and 130 μm. The planar shape of the heavy release separator 3 is larger than the planar shape of the adhesive layer 2, and the outer edge 3*a* of the heavy release separator 3 extends outward beyond the outer edge 2*a* of the adhesive layer 2. The amount by which the outer edge 3*a* extends outward beyond the outer edge 2*a* is preferably between 2 mm and 20 mm and more preferably between 4 mm and 10 mm, from the viewpoint of ease of handling and release and reduced adhesion of dust and dirt. The planar shapes of the adhesive layer 2 and heavy release separator 3 are preferably rectangular, with the outer edge 3*a* extending beyond the outer edge 2*a* by between 2 mm and 20 mm and more preferably between 4 mm and 10 mm on at least one side, and even more preferably between 2 mm and 20 mm and most preferably between 4 mm and 10 mm on all sides.

The light release separator 4 may be a polymer film such as polyethylene terephthalate, polypropylene, polyethylene or polyester, and is preferably a polyethylene terephthalate film (PET film). The thickness of the light release separator 4 is preferably between 25 μm and 150 μm, more preferably between 30 μm and 100 μm and most preferably between 40 μm and 75 μm. The planar shape of the light release separator 4 is larger than the planar shape of the adhesive layer 2, and the outer edge 4*a* of the light release separator 4 extends outward beyond the outer edge 2*a* of the adhesive layer 2. The amount by which the outer edge 4*a* extends outward beyond the outer edge 2*a* is preferably between 2 mm and 20 mm and more preferably between 4 mm and 10 mm, from the viewpoint of ease of handling and release and reduced adhesion of dust and dirt. The planar shapes of the adhesive layer 2 and light release separator 4 are preferably rectangular, with the outer edge 4*a* extending beyond the outer edge 2*a* by between 2 mm and 20 mm and more preferably between 4 mm and 10 mm on at least one side, and even more preferably between 2 mm and 20 mm and most preferably between 4 mm and 10 mm on all sides.

The peel strength between the heavy release separator 3 and the adhesive layer 2 is also preferably higher than the peel strength between the light release separator 4 and the adhesive layer 2. The peel strength between the heavy release separator 3 and the adhesive layer 2 is preferably between 0.3 N/25 mm and 1.5 N/25 mm, and more preferably between 0.35 N/25 mm and 1.0 N/25 mm. The peel strength between the light release separator 4 and the adhesive layer 2 is preferably between 0.01 N/25 mm and 0.4 N/25 mm, and more preferably between 0.05 N/25 mm and 0.35 N/25 mm. Preferably, the inequality T>S is satisfied, where T is the peel strength between the heavy release separator 3 and the adhesive layer 2, and S is the peel strength between the light release separator 4 and the adhesive layer 2. The peel strength between the separators 3,4 and the adhesive layer 2 may be adjusted by surface treatment of the separators 3,4, for example. Surface treatment can be accomplished by release treatment with a silicone-based compound or fluorine-based compound.

The peel strength was measured at 25° C. using a TENSILON RTG-1210 Universal Tester by A&D. The measurement was by 90 degree peeling for the "peel strength between the heavy release separator 3 and adhesive layer 2" and the "peel strength between the light release separator 4 and adhesive layer 2". The "peel strength between the glass substrate and adhesive layer 2" was measured with 180 degree peeling. The pull rate was 300 mm/min for both 90 degree and 180 degree peeling.

Notch 3*c* is formed on the side 3*b* of the heavy release separator 3 facing the adhesive layer 2, along the outer edge 2*a* of the adhesive layer 2. The average value for the depth D of the notch 3*c* at all of the outer edge 2*a* is between 5 μm and 45 μm, but it is more preferably between 10 μm and 40 μm. The standard deviation for the depth D at all of the outer edge 2*a* is no greater than 15 μm, more preferably no greater than 12 μm and most preferably no greater than 5 μm. The minimum depth $D_{min}$ of the notch 3*c* is at least 5 μm and the maximum depth $D_{max}$ is preferably no greater than 45 μm, and more preferably the minimum depth $D_{min}$ is at least 10 μm and the maximum depth $D_{max}$ is no greater than 40 μm.

The average value and standard deviation for the depth D of the notch 3*c* can be easily calculated by the following formula, using the depth D measured at multiple measuring points allocated on the outer edge 2*a* of the adhesive layer 2.

$$\text{Average value(arithmetic mean)}X_{AV}=(X1+X2+X3+\ldots+Xn)/n$$

$$\text{Standard deviation } \sigma=[\{(X1-X_{AV})^2+(X2-X_{AV})^2+(X3-X_{AV})^2+\ldots+(Xn-X_{AV})^2\}/n]^{1/2}$$

X1, X2, X3, . . . Xn: Measurement results at n measuring points.

Figure 2:
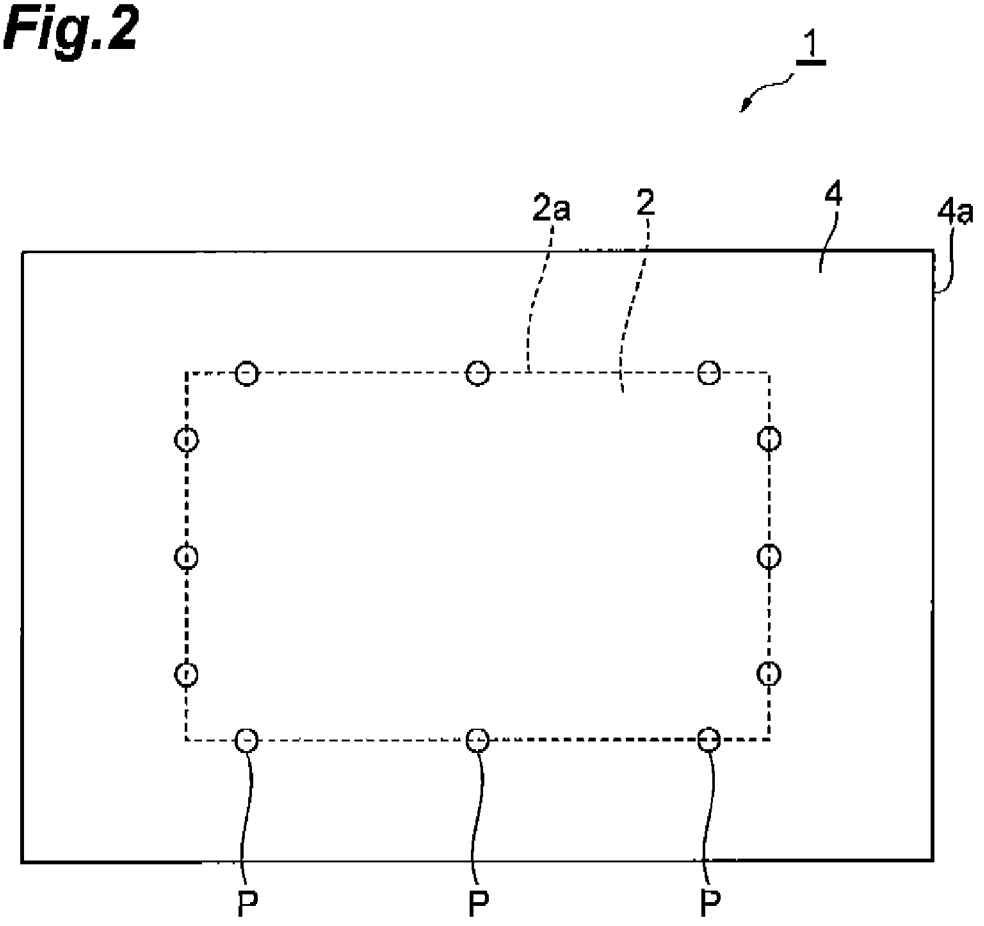
FIG. 2 is a plan view of the adhesive film of FIG. 1.

As shown in FIG. 2, the measuring points P for the depth D are preferably allocated at a greater number of points dispersed along the outer edge 2*a* of the adhesive layer 2. For example, when the outer edge 2*a* of the adhesive layer 2 forms a rectangle, the measuring points P are preferably allocated in at least one location on each side of the outer edge 2*a*. The measuring points P are preferably allocated at 3 points on each side of the outer edge 2*a*. The depth D of the notch 3*c* can be measured, for example, by cross-sectional observation with an electron microscope or by non-contact level measurement.

Figure 3:
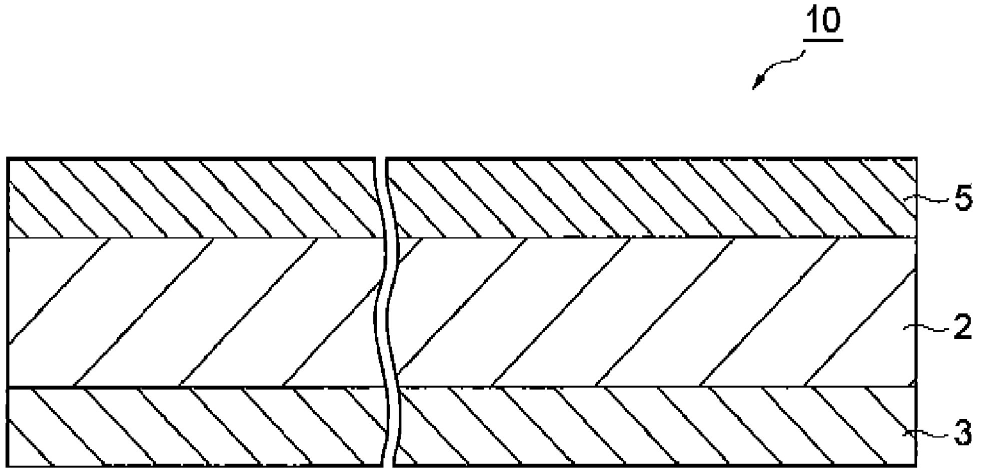
FIG. 3 is a cross-sectional diagram showing of a preliminary film.

The adhesive film 1 described above may be produced in the following manner. First, as shown in FIG. 3, the adhesive layer 2 is formed on the heavy release separator 3, and a temporary separator 5 is formed on the adhesive layer 2, to prepare a preliminary film 10. The temporary separator 5 may be a layer made of the same material as the light release separator 4, for example.

Figure 4:
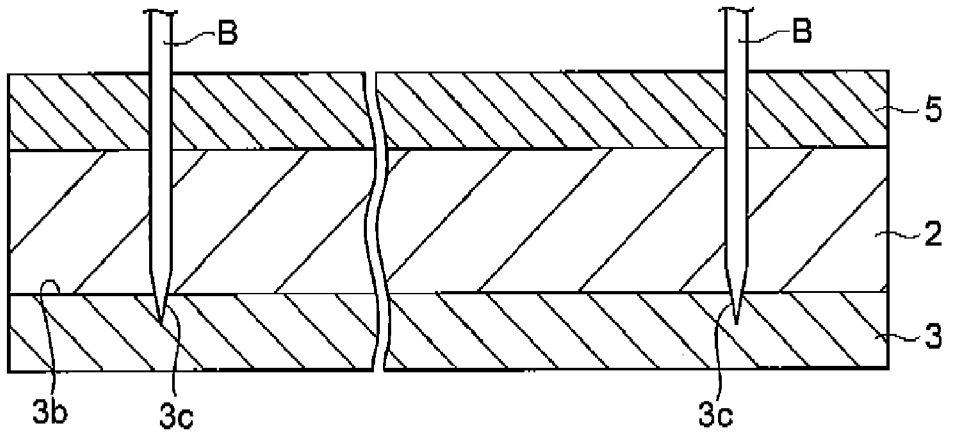
FIG. 4 is a cross-sectional diagram illustrating a cutting step.

Next, as shown in FIG. 4, a die cutter (not shown) equipped with a blade B is used to cut the temporary separator 5 and the adhesive layer 2 into the desired shape. The die cutter may be a crank-type die cutter, a reciprocating die cutter or a rotary-type die cutter. From the viewpoint of releasability of each base material, a rotary die cutter is preferred. In this step, the blade B is passed through the temporary separator 5 and adhesive layer 2 to a depth reaching the heavy release separator 3, thereby cutting the temporary separator 5 and adhesive layer 2. This forms notch 3*c* in the heavy release separator 3. Also in this step, the blade B reaches the heavy release separator 3 in a manner such that the average value of the depth D of the notch 3*c* over all of the outer edge 2*a* of the adhesive layer 2 is between 5 μm and 45 μm. The blade B also reaches the heavy release separator 3 in a manner such that the standard deviation for the depth D of the notch 3*c* over all of the outer edge 2*a* of the adhesive layer 2 is no greater than 15 μm. In order for the average value of the depth D of the notch 3*c* to be between 5 μm and 45 μm and the standard deviation to be no greater than 15 μm, a rotary blade, for example, may be used in combination with control means (such as a computer) operating in tandem therewith to control the depth D.

Figure 5:
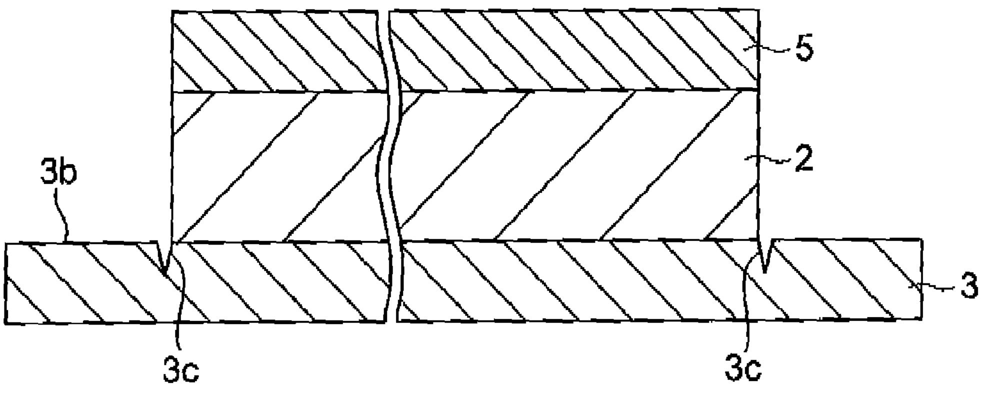
FIG. 5 is a cross-sectional diagram illustrating a removal step.
Figure 6:
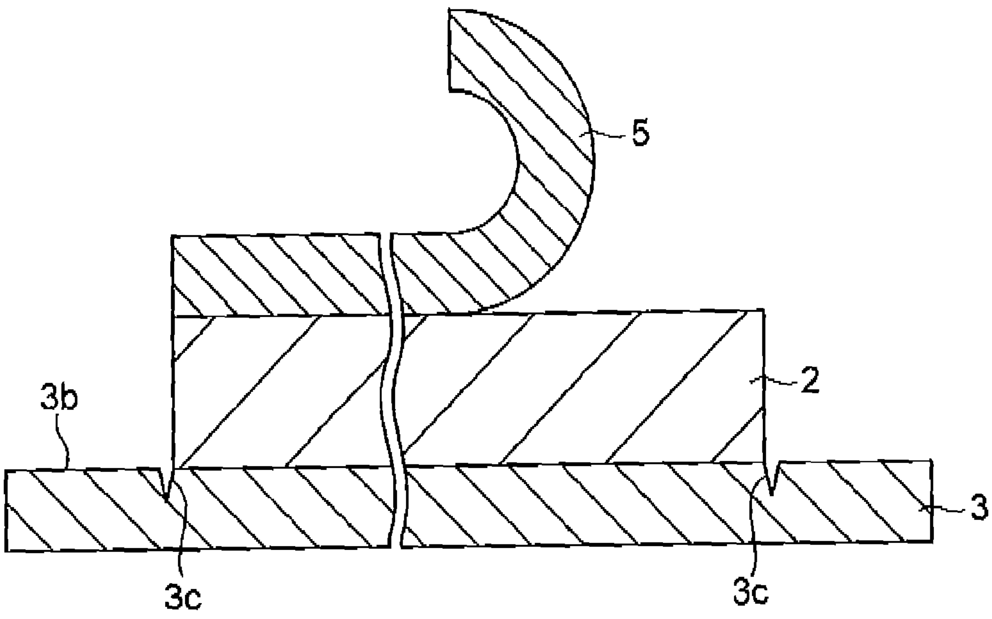
FIG. 6 is a cross-sectional diagram illustrating a removal step.
Figure 7:
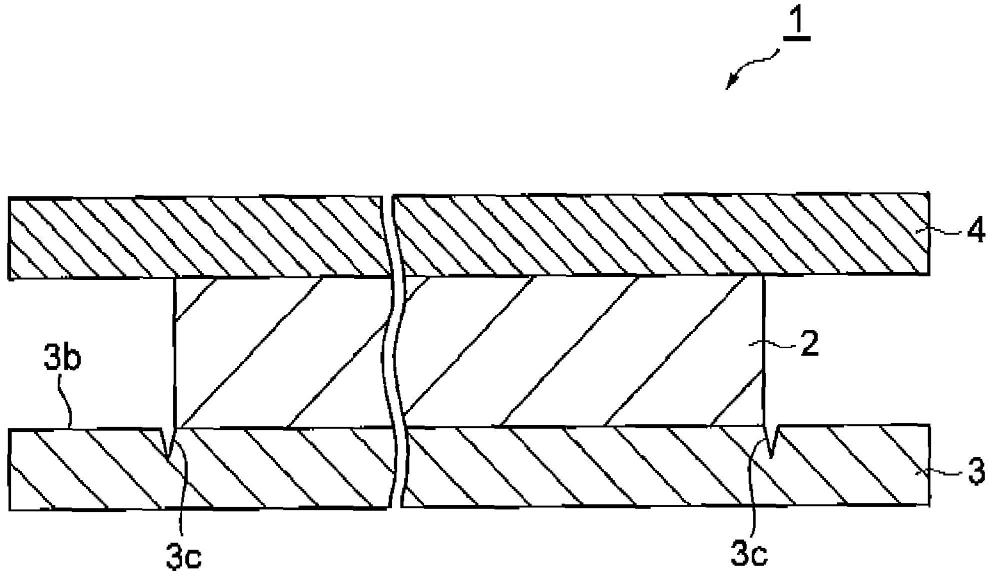
FIG. 7 is a cross-sectional diagram illustrating an attachment step.
Figure 8:
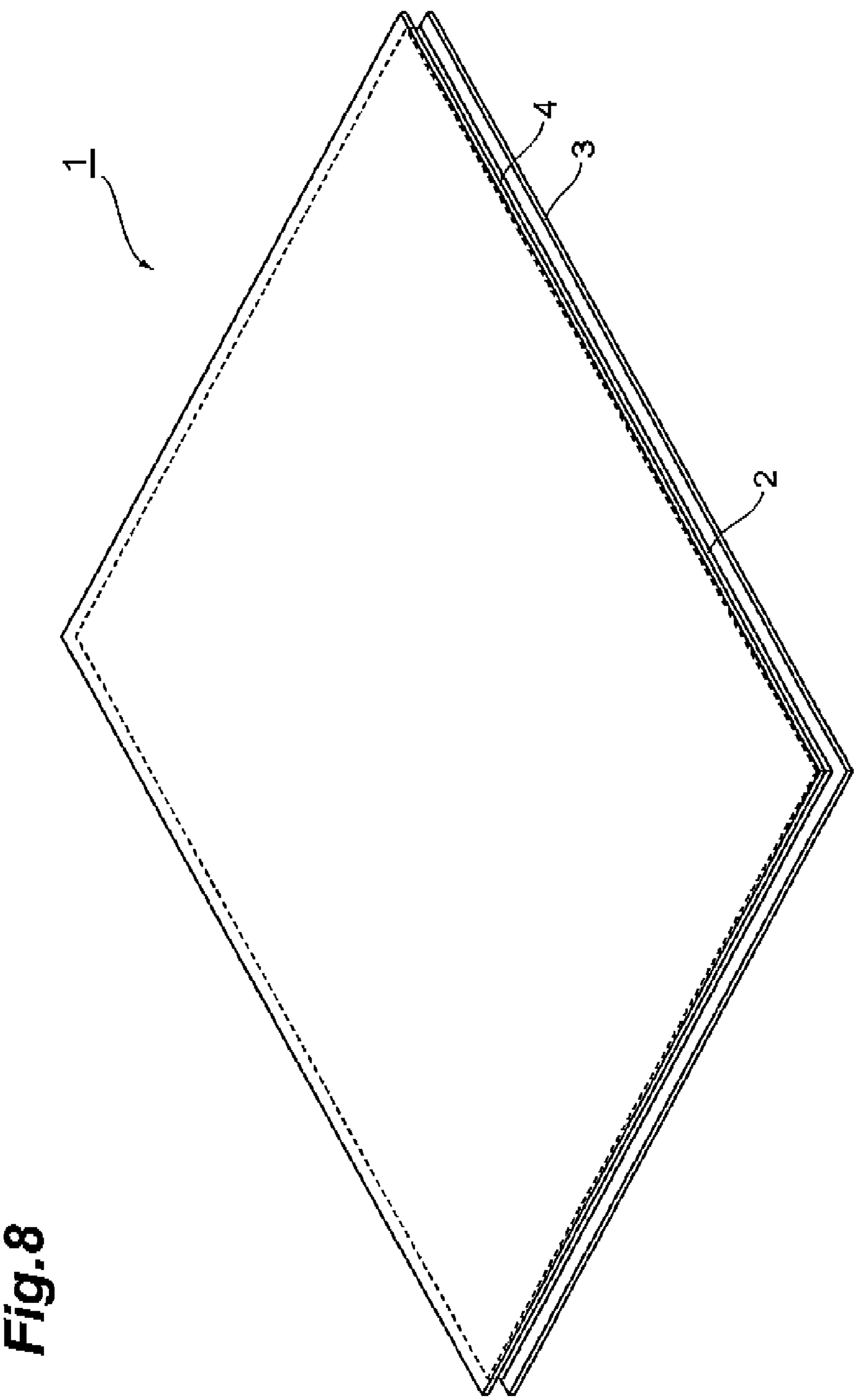
FIG. 8 is a perspective view illustrating an attachment step.

Next, as shown in FIG. 5, the outer sections of the temporary separator 5 and the adhesive layer 2 are removed, the temporary separator 5 is separated from the adhesive layer 2 as shown in FIG. 6, and then the light release separator 4 is placed essentially doubled over the heavy release separator 3 and the light release separator 4 is attached to the adhesive layer 2, as shown in FIG. 7 and FIG. 8. This step completes the adhesive film 1. The heavy release separator 3 and light release separator 4 may be of approximately the same shape and size, or one may be slightly larger than the other. According to the invention, the light release separator 4 is preferably larger than the heavy release separator 3, from the viewpoint of manageability.

Figure 9:
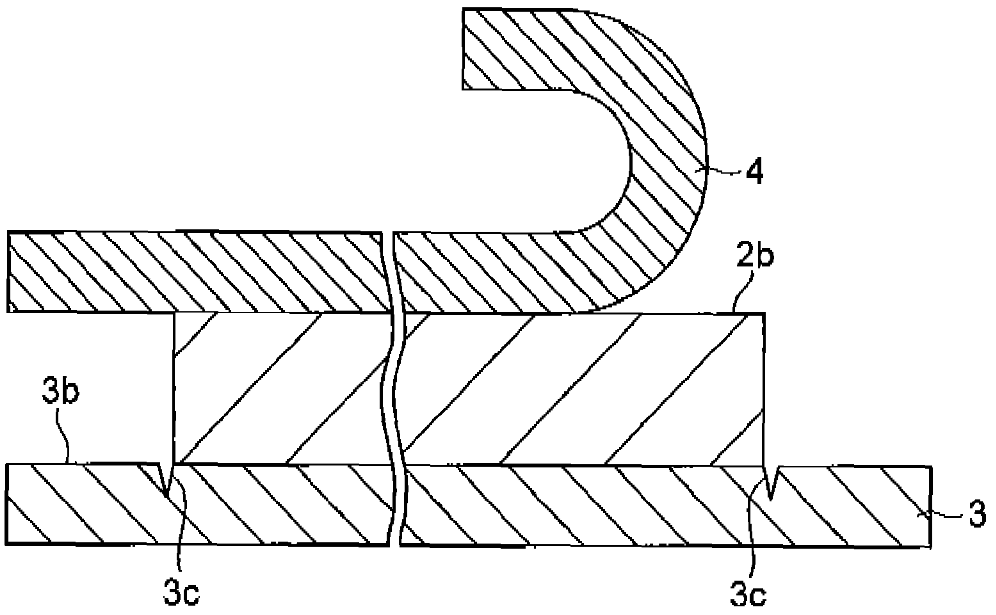
FIG. 9 is a cross-sectional diagram illustrating a light release separator-releasing step.
Figure 10:
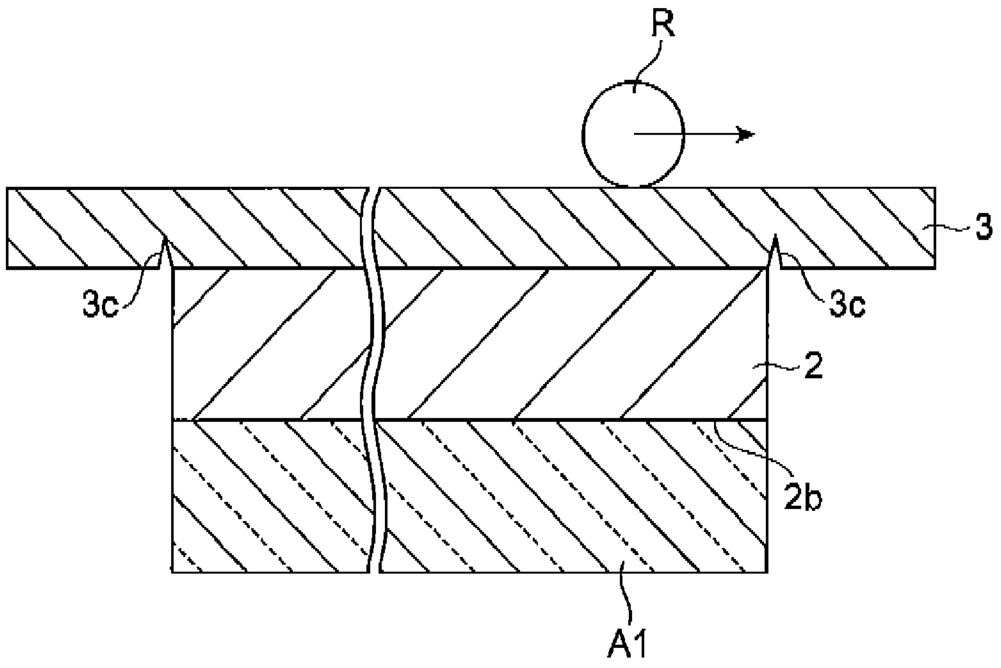
FIG. 10 is a cross-sectional diagram illustrating a step of attachment of a side onto an adherend.
Figure 11:
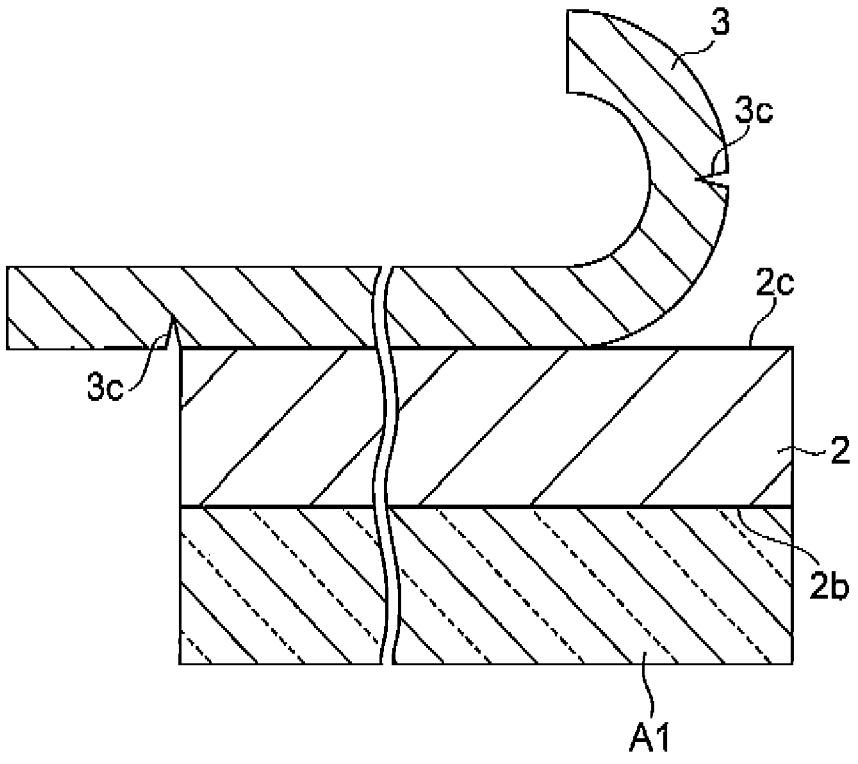
FIG. 11 is a cross-sectional diagram illustrating a heavy release separator-releasing step.
Figure 12:
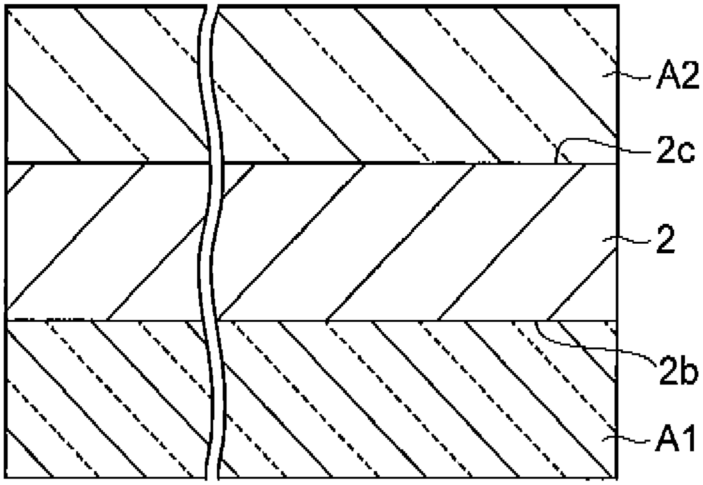
FIG. 12 is a cross-sectional diagram illustrating a step of attachment of a side of an adhesive layer onto an adherend.

The adhesive film 1 may be used in the following manner for assembly of a touch panel display. First, as shown in FIG. 9, the light release separator 4 is released from the adhesive layer 2 to expose the adhesive side 2*b* of the adhesive layer 2. Next, as shown in FIG. 10, the adhesive side 2*b* of the adhesive layer 2 is attached to an adherend A1 and pressed with a roller R, for example. The adherend A1 may be, for example, a liquid crystal panel, a protective panel (glass substrate, acrylic resin board, polycarbonate board or the like), or a touch panel. Next, as shown in FIG. 11, the heavy release separator 3 is released from the adhesive layer 2 to expose the adhesive side 2*c* of the adhesive layer 2. Then, as shown in FIG. 12, the adhesive side 2*c* of the adhesive layer 2 is attached to the adherend A2 and heated and pressed. The adherend A2 may be, for example, a liquid crystal panel, a protective panel (glass substrate, acrylic resin board, polycarbonate board or the like), or a touch panel. In the steps described above, the adhesive layer 2 is disposed between the adherend A1 and the adherend A2. The adhesive layer 2 is preferably used between a protective panel and a touch panel or between a touch panel and a liquid crystal panel. In recent years, there has been ongoing development into touch panel displays with so-called on-cell or in-cell structures. The touch panel function of a touch panel display with an on-cell or in-cell structure is incorporated into the liquid crystal panel. The touch panel display with an on-cell or in-cell structure includes a protective panel, a polarizing plate, a liquid crystal panel (liquid crystal module with touch panel function) and the like. The adherends A1,A2 may be a protective panel, a polarizing plate, a liquid crystal panel and the like composing the touch panel display with an on-cell or in-cell structure.

With this type of adhesive film 1, the outer edges 3*a*, 4*a* of the separators 3,4 extend outward beyond the outer edge 2*a* of the adhesive layer 2, and therefore the outer edge section of the adhesive layer 2 is reliably protected during storage and transport of the adhesive film 1. Notch 3*c* is also formed on the side 3*b* of the heavy release separator 3 facing the adhesive layer 2, using the blade B.

Figure 13:
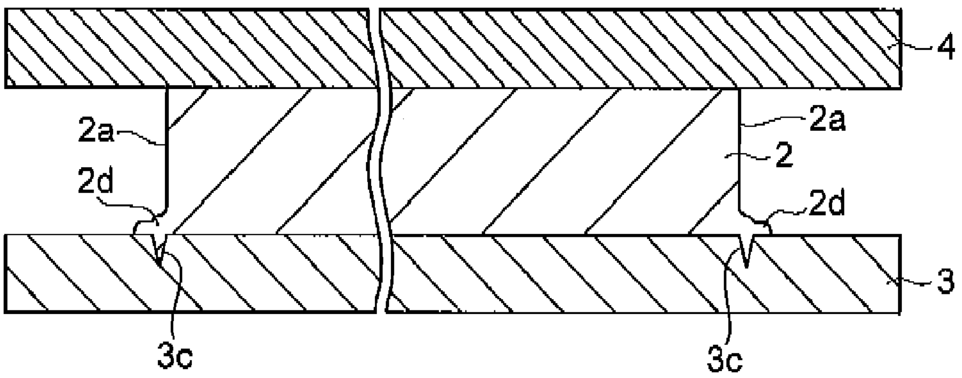
FIG. 13 is a cross-sectional diagram showing the outer edge of an adhesive layer where the notch depth is insufficient.
Figure 14:
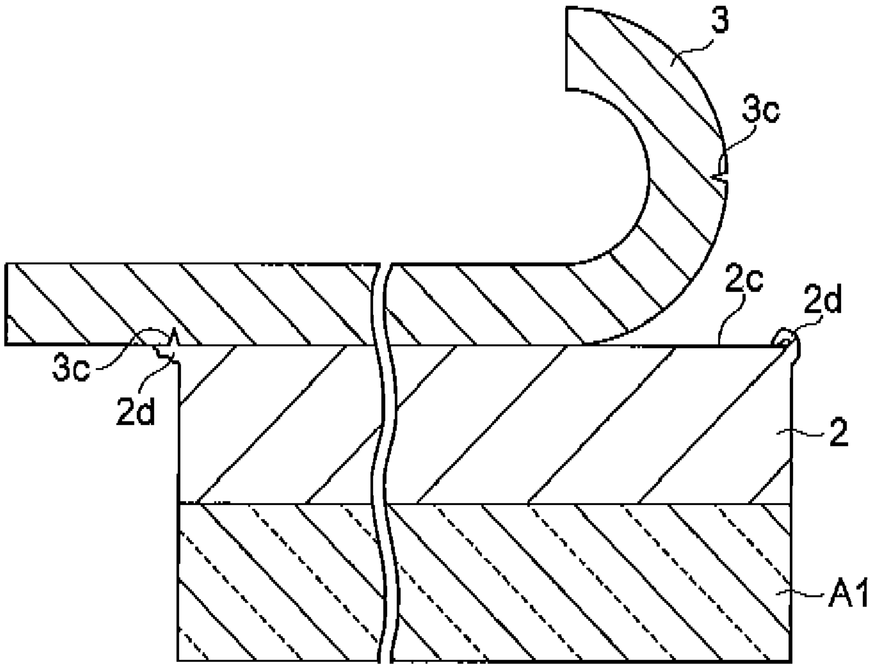
FIG. 14 is a cross-sectional diagram showing the state of release of a heavy release separator for FIG. 13.

If the depth D of the notch 3*c* is too small, the adhesive layer 2 may be incompletely cut. Incomplete cutting of the adhesive layer 2 may cause edge remnants 2*d* projecting outward from the outer edge 2*a* of the adhesive layer 2 near the heavy release separator 3, as shown in FIG. 13. When edge remnants 2*d* are formed, they often loop back onto the adhesive side 2*c* when the heavy release separator 3 has been released, potentially deforming the shape of the adhesive layer 2, as shown in FIG. 14, for example. For the adhesive film 1, therefore, the average value of the depth D of the notch 3*c* is specified to be at least 5 μm. This allows complete cutting of the adhesive layer 2 as the blade B reliably passes through to the heavy release separator 3 side.

Figure 15:
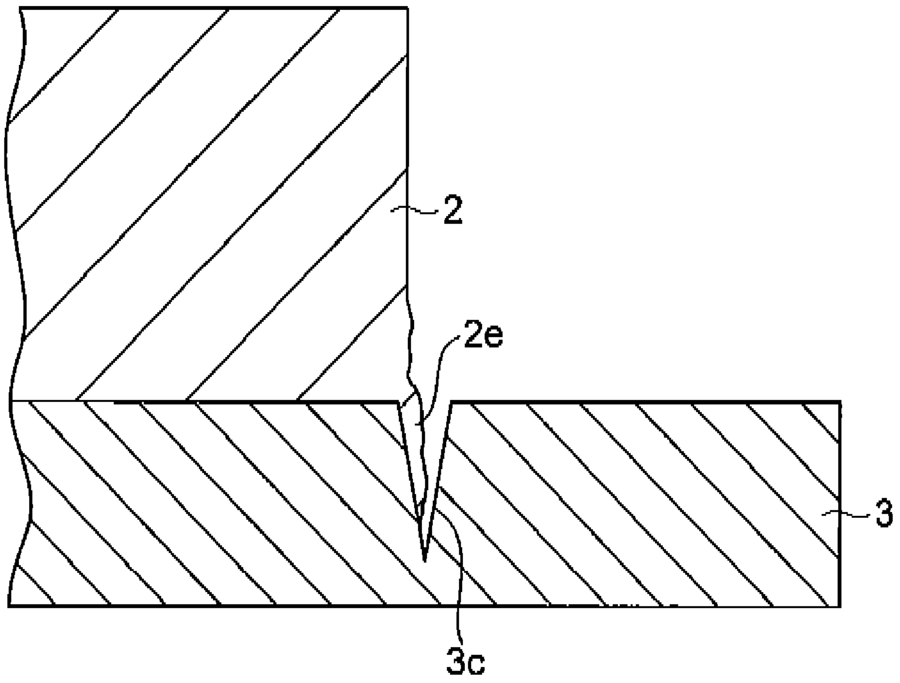
FIG. 15 is a cross-sectional diagram showing the outer edge of an adhesive layer where the notch depth is excessive.
Figure 16:
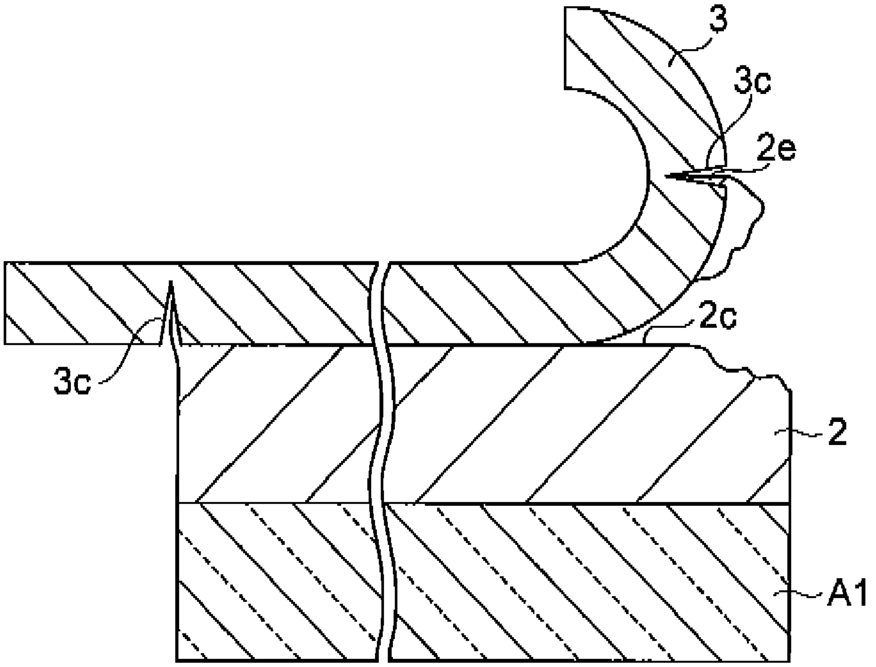
FIG. 16 is a cross-sectional diagram showing the state of release of a heavy release separator for FIG. 15.

If the depth D of the notch 3*c* is too large, a portion of the adhesive layer 2 may intrude into the notch 3*c* when the adhesive layer 2 is cut with the blade B, as illustrated in FIG. 15. The portion 2*e* intruding into a notch 3*c* is difficult to remove from the notch 3*c*. This may reduce the releasability of the heavy release separator 3, potentially causing release problems. It can also result in outer edge section of the adhesive layer 2 being torn off when the heavy release separator 3 is released, as shown in FIG. 16. For the adhesive film 1, therefore, the average value of the depth D of the notch 3*c* is specified to be no greater than 45 μm. This can prevent portions of the adhesive layer 2 from deeply intruding in the notch 3*c* during cutting of the adhesive layer 2 with the blade B. By thus minimizing intrusion of the adhesive layer 2 into the notch 3*c*, it is possible to reduce release problems between the adhesive layer 2 and the heavy release separator 3.

The standard deviation for the depth D of the notch 3*c* is limited to no greater than 15 μm. This will reduce variation in the depth D of the notch 3*c* to allow complete cutting of the adhesive layer 2, while also providing a more reliable effect of minimizing release problems between the adhesive layer 2 and the heavy release separator 3. The depth D of the notch 3*c* can be stipulated by the standard deviation in this manner based on the fact that the effect of the invention is not impeded even when some portions of the notch 3*c* along the outer edge 2*a* of the adhesive layer 2 have depths outside of the aforementioned range.

A large variation in the depth D of the notch 3*c* can not only result in cutting failures in the adhesive layer 2 and release problems between the adhesive layer 2 and the heavy release separator 3, but can also lead to release problems between the adhesive layer 2 and the light release separator 4. Release problems between the adhesive layer 2 and the light release separator 4 indicate that the peel strength between the light release separator 4 and the adhesive layer 2 is higher than the designed level. This can hinder manageability during touch panel display assembly. By limiting the standard deviation for the depth D of the notch 3*c* to no greater than 15 μm, it is possible to prevent such release problems between the adhesive layer 2 and the light release separator 4. One reason such release problems between the adhesive layer 2 and light release separator 4 tend to occur is non-homogeneity of the cross-sectional shape and thickness of the adhesive layer 2 near the notch 3*c*, which is a result of variation in the depth D of the notch 3*c*.

The peel strength between the heavy release separator 3 and the adhesive layer 2 is also preferably higher than the peel strength between the light release separator 4 and the adhesive layer 2. This can render the heavy release separator 3 more difficult to release from the adhesive layer 2 than the light release separator 4. In addition, since the blade B passes through the adhesive layer 2 toward the heavy release separator 3 side, as mentioned above, the outer edge section of the adhesive layer 2 becomes pressed against the heavy release separator 3. As a result, the heavy release separator 3 becomes more difficult to release from the adhesive layer 2 than the light release separator 4, so that the light release separator 4 can be released without release of the heavy release separator 3. It is thus possible to separately release the separators 3,4, and thereby allow reliable release of the separators and orderly attachment of the adhesive layer 2 to adherends A1,A2.

The storage elastic modulus of the adhesive layer 2 at 25° C. is between $1.0\times10^3$ Pa and $1.0\times10^6$ Pa. This will result in a closer relationship between the depths of the notch 3*c* and the cuttability and releasability of the adhesive layer 2, so that the effect of limiting the depths of the notch 3*c* to the aforementioned range will be more prominent.

The peel strength of the adhesive layer 2 for glass substrates is between 5 N/10 mm and 20 N/10 mm. This will result in an even closer relationship between the depths of the notch 3*c* and the cuttability and releasability of the adhesive layer 2, so that the effect of limiting the depths of the notch 3*c* to the aforementioned range will be even more prominent.

The embodiments described above are preferred embodiments of the invention, but the invention is not necessarily limited thereto and may incorporate various modifications within the scope of the gist thereof.

EXAMPLES

An example of the adhesive film 1 will now be described.

[Formation of Adhesive Film 1 with Adhesive Layer 2 Thickness of 175 μm]

Adhesive films 1 for Examples 1 to 4 and Comparative Examples 1 to 3 were formed in the following order (I) to (V), using 75 μm-thick polyethylene terephthalate (Fujimori Kogyo Co., Ltd.) as the heavy release separator 3, 50 μm-thick polyethylene terephthalate (Fujimori Kogyo Co., Ltd.) as the light release separator 4 and making the adhesive layer 2 of 175 μm thickness.

(I) A liquid adhesive composition comprising components A to C listed below was coated onto the heavy release separator 3 at ordinary temperature, and an ultraviolet irradiation device was used for irradiation of ultraviolet rays at 700 $mJ/cm^2$ to produce a adhesive layer 2.

A: Acrylic acid-based derivative polymer: 30 parts by mass of copolymer with weight-average molecular weight of 200,000, synthesized from 2-ethylhexyl acrylate/2hydroxyethyl acrylate=7/3 (mass ratio)

B: Acrylic acid-based derivative: 69 parts by mass of 2-ethylhexyl acrylate/2-hydroxyethyl acrylate/acryloylmorpholine/diacrylate with polyalkylene glycol chains and urethane bonds (weight-average molecular weight of 20,000)=40/10/14/5 (mass ratio)

C: Polymerization initiator: 1 part by mass 1-hydroxycyclohexylphenyl ketone.

The diacrylate with polyalkylene glycol chains and urethane bonds (weight-average molecular weight: 20,000) was synthesized in the following manner. To a reactor equipped with a condenser tube, thermometer, stirrer, dropping funnel and air-injection tube there were added 303.92 g of polypropylene glycol (Molecular weight: 2000), 8.66 g of 2-hydroxyethyl acrylate modified with 2 mol of ϵ-caprolactone (PLACCEL FA2D, trade name of Daicel Chemical Industries, Ltd.), 99.74 g of 2-hydroxyethyl acrylate, 0.12 g of p-methoxyphenol and 0.5 g of dibutyltin dilaurate, the temperature was increased to 75° C. while circulating air, and then 36.41 g of isophorone diisocyanate was added dropwise uniformly over a period of 2 hours while stirring at 75° C., for reaction. Upon completion of the dropwise addition, reaction was conducted for 5 hours and 44.88 g of 2-hydroxyethyl acrylate was further added and allowed to react therewith for 1 hour. Reaction was complete upon confirming disappearance of isocyanate by IR measurement. A diacrylate with polyalkylene glycol chains and urethane bonds (weight-average molecular weight: 20,000) was thus obtained.

The weight-average molecular weight of the acrylic acid-based derivative polymer and the diacrylate with polyalkylene glycol chains and urethane bonds is the value determined by gel permeation chromatography with the following devices and measuring conditions, and calculation based on a calibration curve for standard polystyrene. The calibration curve was plotted using a 5 sample set (PStQuick MP-H, PStQuick B, product of Tosoh Corp.) as the standard polystyrene.

Apparatus: HCL-8320GPC High-speed GPC (detector: differential refractometer) (trade name of Tosoh Corp.)
Solvent: Tetrahydrofuran (THF)
Column: TSKGEL SuperMultipore HZ-H (Tosoh Corp.)
Column size: Column length=15 cm, Inner column diameter: 4.6 mm
Measuring temperature: 40° C.
Flow rate: 0.35 ml/min
Sample concentration: 10 mg/5 mL THF
Injection rate: 20 μl (II) A temporary separator 5 (polyethylene terephthalate, 50 μm thickness, Fujimori Kogyo Co., Ltd.) was laminated on the adhesive layer 2.

(III) The heavy release separator 3, adhesive layer 2 and temporary separator 5 were cut to a 220 mm×180 mm size using a rotary blade with a diameter of 72 mm.

(IV) The adhesive layer 2 and temporary separator 5 were cut to a 205 mm×160 mm size using a rotary blade with a diameter of 72 mm. A rotary die cutter was used for Examples 1 to 4 and Comparative Examples 1 and 2. A reciprocating die cutter was used for Comparative Example 3. Table 1 shows the measured values, average values and standard deviations for the depth D of the notch 3*c* in the heavy release separators 3 of Examples 1 to 4 and Comparative Examples 1 to 3. The measured values shown in Table 1 are those measured at the 12 points illustrated in FIG. 2.

(V) The temporary separator 5 was released, and a 215 mm×170 mm light release separator 4 was laminated on the adhesive layer 2. The lamination was performed in such a manner that the long sides of the light release separator 4 extended 5 mm beyond the long sides of the adhesive layer 2, and the short sides of the light release separator 4 extended 5 mm beyond the short sides of the adhesive layer 2.

The 25° C. storage elastic modulus was approximately $2\times10^5$ Pa for the adhesive layers 2 of Examples 1 to 4 and Comparative Examples 1 to 3. The 25° C. peel strength of the adhesive layer 2 on the glass substrate was 8 N/10 mm. In Examples 1 to 4, the peel strength between the heavy release separator 3 and adhesive layer 2 was approximately 1 N/25 mm, and the peel strength between the light release separator 4 and adhesive layer 2 was approximately 0.3 N/25 mm.

Figure 17:
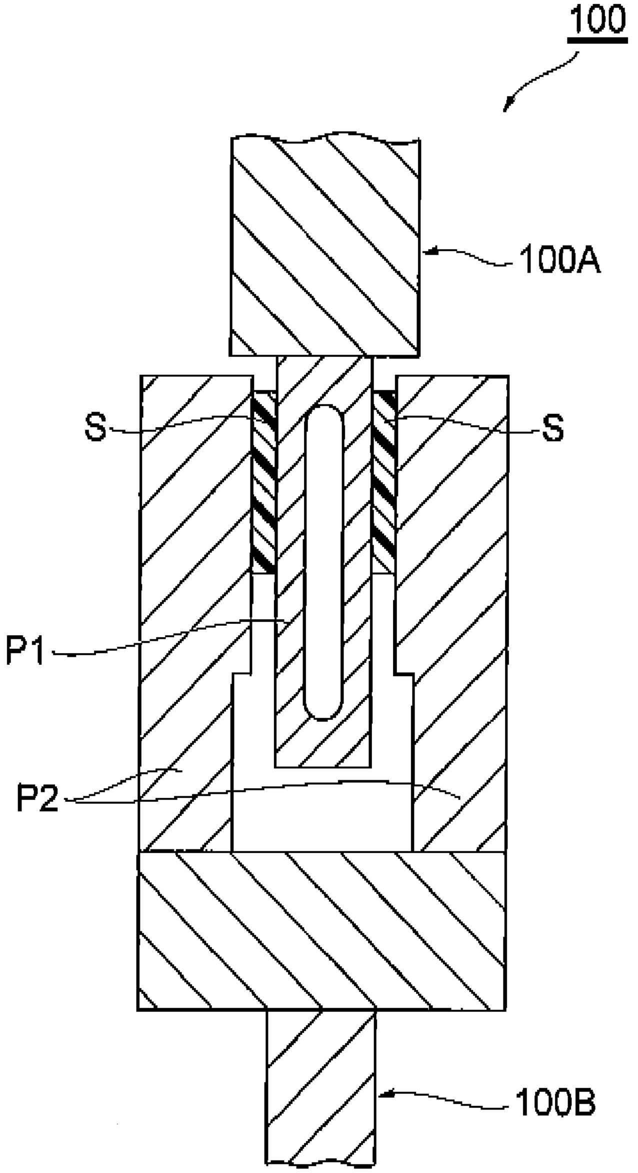
FIG. 17 is a schematic diagram illustrating a method of setting a sample on a macrodynamic viscoelasticity meter.

The storage elastic modulus was measured in the following manner. First, two adhesive layers 2 with thicknesses of 250 μm were prepared with the same composition and conditions as above, and stacked for a thickness of approximately 500 μm, after which the stack was cut into a 10 mm square to form a sample S. Two samples S were prepared and set on a macrodynamic viscoelasticity meter by means of a jig 100. As shown in FIG. 17, the jig 100 comprised a pair of mounting jigs 100A, 100B mounted on the macrodynamic viscoelasticity meter so as to face each other. The mounting jig 100A was provided with a plate P1 extending toward the mounting jig 100B. The mounting jig 100B was provided with a pair of plates P2,P2 each facing a side of the plate P1, and extending toward the mounting jig 100A. Each plate P2 was attached to the plate P1 through a sample S. The mounting jigs 100A, 100B were thus moved away from each other by the macrodynamic viscoelasticity meter, and the storage elastic modulus was measured in this manner. The macrodynamic viscoelasticity meter used was a Solids Analyzer RSA-II by Rheometric Scientific, and the measuring conditions were shear sandwich mode, 1.0 Hz frequency, with temperature increase at 5° C./min in a measuring temperature range of −20° C. to 100° C.

[Formation of Adhesive Film 1 with Adhesive Layer 2 Thickness of 350 μm]

An adhesive film 1 for Example 5 was formed in the same order as in Examples 1 to 4, using 75 μm-thick polyethylene terephthalate (Fujimori Kogyo Co., Ltd.) as the heavy release separator 3, 50 μm-thick polyethylene terephthalate (Fujimori Kogyo Co., Ltd.) as the light release separator 4, and making the adhesive layer 2 of 350 μm thickness. Table 1 shows the measured values, average values and standard deviations for the depth D of the notch 3*c* for Example 5. The 25° C. storage elastic modulus of the adhesive layer 2, the peel strength onto a glass substrate, the peel strength between the heavy release separator 3 and adhesive layer 2 and the peel strength between the light release separator 4 and adhesive layer 2 were equivalent to those of Examples 1 to 4.

[Evaluation of Cuttability]

The cuttability was evaluated as follows. The evaluation results are shown in Table 1.

OK: Easy removal of the outer section of the adhesive layer 2, or no edge remnants 2*d* formed on the outer edge 2*a* of the adhesive layer 2 after removal of the outer section.

NG: Difficult removal of the outer section of the adhesive layer 2, or edge remnants 2*d* formed on the outer edge 2*a* of the adhesive layer 2 after removal of the outer section.

[Evaluation of Releasability of Heavy Release Separator 3]

The releasability was evaluated as follows. The evaluation results are shown in Table 1.

OK: No tearing at the outer edge section of the adhesive layer 2 after release of the heavy release separator 3, or easy release without deformation of the outer edge section of the adhesive layer 2.

NG: Tearing at the outer edge section of the adhesive layer 2 after release of the heavy release separator 3, or difficult release with deformation of the outer edge section of the adhesive layer 2.

[Evaluation of Releasability of Light Release Separator 4]

The releasability was evaluated as follows. The evaluation results are shown in Table 1.

OK: Peel strength between light release separator 4 and adhesive layer 2 lower than peel strength between heavy release separator 3 and adhesive layer 2, allowing easy release.

NG: Peel strength between light release separator 4 and adhesive layer 2 equal or nearly equal to peel strength between heavy release separator 3 and adhesive layer 2, making release difficult.

TABLE 1

| Items of the Results | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Measured depth D (1) [μm] | 15 | 12 | 39 | 30 | 30 | 4 | 45 | 5 |
| Measured depth D (2) [μm] | 12 | 25 | 40 | 30 | 30 | 3 | 47 | 6 |
| Measured depth D (3) [μm] | 11 | 38 | 40 | 30 | 30 | 3 | 48 | 6 |
| Measured depth D (4) [μm] | 11 | 38 | 40 | 30 | 30 | 4 | 49 | 5 |
| Measured depth D (5) [μm] | 14 | 38 | 40 | 30 | 30 | 3 | 50 | 4 |
| Measured depth D (6) [μm] | 13 | 38 | 40 | 31 | 31 | 4 | 50 | 25 |
| Measured depth D (7) [μm] | 16 | 38 | 40 | 32 | 32 | 4 | 50 | 48 |
| Measured depth D (8) [μm] | 18 | 25 | 38 | 29 | 29 | 3 | 49 | 48 |
| Measured depth D (9) [μm] | 13 | 12 | 39 | 29 | 29 | 4 | 48 | 48 |
| Measured depth D (10) [μm] | 14 | 12 | 39 | 29 | 29 | 4 | 47 | 49 |
| Measured depth D (11) [μm] | 15 | 12 | 38 | 29 | 29 | 4 | 46 | 48 |
| Measured depth D (12) [μm] | 13 | 12 | 40 | 28 | 28 | 4 | 45 | 25 |
| Average depth D [μm] | 12.8 | 25 | 39.4 | 29.8 | 29.8 | 3.7 | 47.8 | 26.4 |
| Depth D, S.D. [μm] | 1.96 | 11.9 | 0.76 | 1.01 | 1.01 | 0.47 | 1.77 | 19.6 |
| Adhesive layer Cuttability | OK | OK | OK | OK | OK | NG | OK | OK |
| Heavy release separator 3 releasability | OK | OK | OK | OK | OK | OK | NG | OK |
| Light release separator 4 releasability | OK | OK | OK | OK | OK | OK | OK | NG |

[Evaluation Results]

As shown in Table 1, an average value of at least 5 μm for the depth D of the notch 3*c* allowed complete cutting of the heavy release separator 3 without formation of edge remnants 2*d* in the outer edge 2*a* of the adhesive layer 2. It was also confirmed that an average value of no greater than 45 μm for the depth D of the notch 3*c* prevents release problems between the heavy release separator 3 and adhesive layer 2.

Furthermore, when the standard deviation for the depth D of the notch 3*c* exceeded 15 μm, even with an average value for the depth D of the notch 3*c* of between 5 μm and 45 μm, this resulted in cutting failures of the adhesive layer 2 and release problems between the light release separator 4 and adhesive layer 2 (Comparative Example 3).

What is claimed is:

1. An adhesive film comprising:

an adhesive layer; and a first base material and a second base material sandwiching the adhesive layer;

wherein outer edges of the first base material and the second base material extend outward beyond the outer edge of the adhesive layer, a notch is formed on the adhesive layer side of the first base material, along the outer edge of the adhesive layer, the first base material has a thickness greater than the second base material, an average notch depth is between 5 μm and 45 μm, a standard deviation for the notch depth is no greater than 15 μm, and wherein a peel strength between the first base material and the adhesive layer is higher than a peel strength between the second base material and the adhesive layer.

2. The adhesive film according to claim 1, wherein the outer edge of the adhesive layer forms a rectangular planar shape, the average notch depth is between 5 μm and 45 μm at multiple measured points, allocated in at least one location on each side of the outer edge of the adhesive layer, and the standard deviation for the notch depth at the multiple measured points is no greater than 15 μm.

3. The adhesive film according to claim 1, wherein a storage elastic modulus of the adhesive layer at 25° C. is between $1.0\times10^3$ and $1.0\times10^6$ Pa.

4. The adhesive film according to claim 1, wherein a peel strength of the adhesive layer for a glass substrate is between 5 N/10 mm and 20 N/10 mm.

5. An adhesive film comprising:

an adhesive layer; and a first base material and a second base material sandwiching the adhesive layer;

wherein outer edges of the first base material and the second base material extend outward beyond the outer edge of the adhesive layer, a notch is formed on the adhesive layer side of the first base material, along the outer edge of the adhesive layer, a thickness of the first base material is between 50 μm and 200 μm, an average notch depth is between 5 μm and 45 μm, a standard deviation for the notch depth is no greater than 15 μm, and wherein a peel strength between the first base material and the adhesive layer is higher than a peel strength between the second base material and the adhesive layer.

6. The adhesive film according to claim 5, wherein the outer edge of the adhesive layer forms a rectangular planar shape, the average notch depth is between 5 μm and 45 μm at multiple measured points, allocated in at least one location on each side of the outer edge of the adhesive layer, and the standard deviation for the notch depth at the multiple measured points is no greater than 15 μm.

7. The adhesive film according to claim 5, wherein a storage elastic modulus of the adhesive layer at 25° C. is between $1.0\times10^3$ and $1.0\times10^6$ Pa.

8. The adhesive film according to claim 5, wherein a peel strength of the adhesive layer for a glass substrate is between 5 N/10 mm and 20 N/10 mm.

* * * * *